United States Patent Office 2,906,062
Patented Sept. 29, 1959

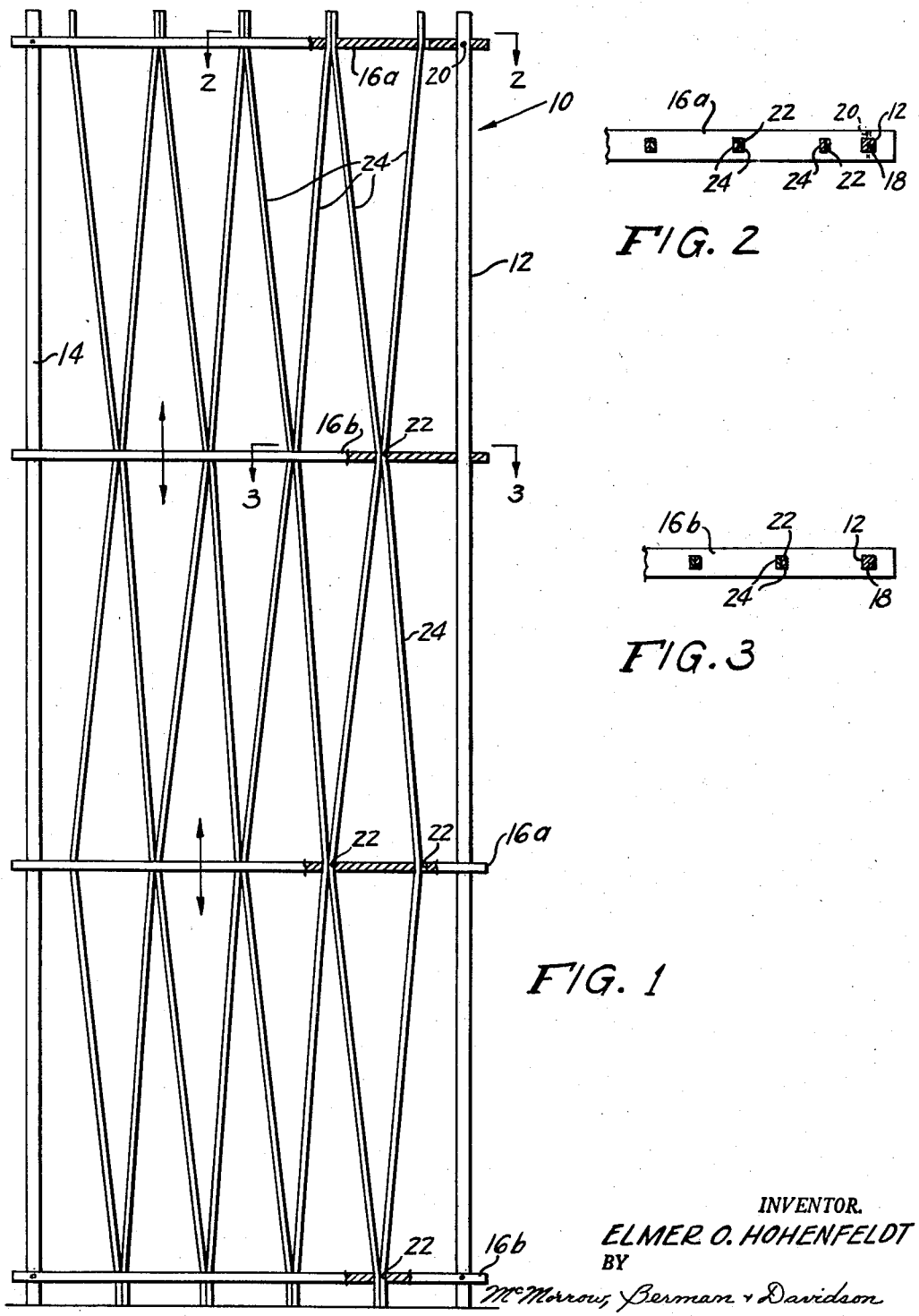

2,906,062

TRELLIS CONSTRUCTION

Elmer O. Hohenfeldt, Springfield, Mo.

Application November 27, 1956, Serial No. 624,540

1 Claim. (Cl. 47—47)

This invention relates to an improved trellis for use in training and supporting vines and bushes.

A primary object of the present invention is to provide a trellis which is designed to permit the plant vines or bushes to catch on to and attach themselves to the trellis without aid and which is constructed so that it will be extremely strong and not easily blown over by winds and so that it will not warp.

Another important object of the present invention is to provide a trellis which can be inexpensively made and which can be sold in a disassembled compact form and easily assembled and erected without any skill or special tools.

Another important object of the present invention is to provide a trellis which includes a plurality of vertically spaced cross bars that extend between and are carried by vertical supports, the cross bars being provided with vertical openings for receiving flexible strips, which are extended between the cross bars in a laced fashion.

Another important object of the instant invention is to provide a simple, compact, inexpensive and durable trellis which will present an artistic appearance.

The foregoing and ancillary objects are attained by this invention, the preferred embodiment of which is set forth in the following description and illustrated in the accompanying drawing, wherein:

Figure 1 is a front elevational view of the trellis of this invention;

Figure 2 is a horizontal sectional view taken on line 2—2 of Figure 1; and

Figure 3 is a horizontal sectional view taken on line 3—3 of Figure 1.

Referring now more particularly to the accompanying drawing, the trellis 10, which is preferably entirely made from wood, but which may be made from other suitable materials, such as plastic or the like, includes a pair of vertical supporting members or rods 12 and 14. The supporting members 12 and 14 are spaced apart and are adapted to be supported in vertical positions. The supporting members may be of various heights, depending upon the height of the bush or vine to be supported by the trellis.

A plurality of cross bars 16 are provided and are disposed between the vertical supporting members and are arranged in vertically spaced relationship. Each of the cross bars is provided adjacent its opposing ends with suitable openings 18, within which the vertical supporting members 12 and 14 are positioned. Any suitable means, such as pins 20 or similar types of fasteners may be used for securely anchoring the uppermost and lowermost cross bars to the vertical supporting members 12 and 14, after the vertical supporting members have been passed through the openings 18 therein. The remaining cross bars, as seen from the double-ended arrows crossing the same in Figure 1, are adjustable longitudinally of the members 12, 14.

The cross bars are provided, intermediate their ends, with vertical openings 22, which are preferably non-circular in cross sectional shape. A plurality of flexible strips 24 are provided and are adapted to be passed through the openings 22 in a laced or zig-zagged fashion, as shown in Figure 1.

In the latter respect, it is to be particularly noted that every other cross bar 16a has its openings 22 in alignment, while the adjoining cross bars 16a and 16b have their openings 22 out of vertical alignment. The vertical strips 24 have their lower ends socketed in the openings 22 in the lowermost cross bar 16b and the strips of each pair extend from said lowermost cross bar upwardly and outwardly in divergent relationship. Thus, the lower ends of the strips are arranged in pairs and each pair is inserted in one of the openings 22, which are of a cross sectional area equal to the combined cross sectional areas of the lower ends of the strips of each pair. The strips of each pair diverge upwardly and outwardly from the lowermost cross bar 16b and are passed through the openings in the adjoining cross bar 16a, in the manner shown in Figure 1, with the outermost strips being passed singly through the outermost openings 22 in the cross bar and the strips, inwardly of such outermost strips, being passed in pairs through the inner openings 22 in the cross bars. From the cross bars 16a, the strips converge upwardly and are passed in pairs, as shown in Figure 1, through the openings 22 in the adjoining strips 16b.

In such fashion, the flexible strips are laced through the cross bars, so that each strip is arranged in a zig-zagged fashion. Obviously, since side-by-side strips that are passed through the same opening diverge in at least one direction from the opening, the cross bar in which the opening is formed is supported in the selected position to which it is adjusted longitudinally of the members 12, 14.

The number of strips will depend upon the width of the trellis and the length of the cross bars will, of course, also depend upon the width of the trellis.

It can be seen that the flexible strips can be easily passed through the openings in the cross bars and will be securely held therein to present a woven or laced affect, which will not only have the desirable attributes of permitting the vines or plants to easily catch and hold thereon but which also present an artistic appearance.

While the preferred form of this invention has been shown in the accompanying drawing and described herein, other forms may be realized as come within the scope of the appended claim.

What is claimed is:

A trellis comprising a pair of elongated, straight, rigid vertical supporting members; a pair of horizontal, rigid first cross bars and a pair of horizontal, rigid second cross bars, extending between and spaced longitudinally of said supporting members, the first cross bars alternating with the second cross bars, the several cross bars having end openings receiving the supporting members; fastening elements at said end openings fixedly engaging the supporting members in the openings of the uppermost and lowermost cross bars, the remaining cross bars being adjustable along the length of the supporting members in respect to each other and to the uppermost and lowermost cross bars, each cross bar having a series of intermediate openings, the intermediate openings of the first cross bars being vertically aligned and the intermediate openings of the second cross bars also being vertically aligned but being offset horizontally from the intermediate openings of the first cross bars; and flexible strips each extending in a zigzag path from the uppermost to the lowermost cross bar through intermediate openings of the several cross bars, each strip being passed with an adjacent strip disposed at one side thereof through an intermediate opening of one cross bar, and being passed with an adjacent strip disposed at the opposite side thereof through vertically aligned openings of the cross bars disposed immediately above and below, respectively, said one cross bar, side-by-side strips that pass together through a single intermediate opening diverging in at least one direction therefrom to hold the cross bar in which said single opening is formed against movement from a selected position to which it is adjusted longitudinally of the supporting members, the several cross bars, strips, and supporting members lying substantially in a common vertical plane.

References Cited in the file of this patent

UNITED STATES PATENTS

| | | | |
|---|---|---|---|
| D. 83,796 | Furlong | Mar. 31, | 1931 |
| 108,280 | Merrick | Oct. 11, | 1870 |
| 166,766 | Goodspeed | Aug. 17, | 1875 |
| 414,175 | Whittaker | Oct. 29, | 1889 |
| 1,601,481 | Schreiber | Sept. 28, | 1926 |
| 1,835,092 | Rowe | Dec. 8, | 1931 |

FOREIGN PATENTS

| | | | |
|---|---|---|---|
| 12,824 | Great Britain | June 8, | 1903 |